United States Patent Office 2,726,220
Patented Dec. 6, 1955

2,726,220

SHAPED ARTICLES OF ACRYLONITRILE POLYMERS

Franklin F. Ogden, Dickinson, Tex., assignor to Monsanto Chemical Company, St. Louis, Mo., a corporation of Delaware No Drawing. Application July 6, 1954,
Serial No. 441,655

18 Claims. (Cl. 260—17)

This invention relates to shaped articles of acrylonitrile polymers or copolymers thereof. More particularly, this invention relates to certain novel and improved shaped articles such as filaments, fibers, threads, yarns, films and the like, comprising acrylonitrile polymers or copolymers thereof and a cyanoethyl ether of cellulose. This invention also relates to the production of such shaped articles.

Shaped articles of acrylonitrile polymers or copolymers thereof, in particular filaments, fibers, threads and yarns, have enjoyed wide-spread utility. These materials may be used in the preparation of fine hosiery as well as the fashioning of heavier, all-purpose fabrics for use as blouses, skirts, suits and various industrial applications. Notwithstanding the present extensive use of these materials, additional applications would be realized if certain physical properties of these materials could be improved. Among such properties which warrant improvement are water susceptibility and decomposition temperature.

It is an object of this invention to provide improved shaped articles of polymeric materials.

It is another object of this invention to provide improved shaped articles of acrylonitrile polymers and copolymers thereof.

It is still another object of this invention to provide highly improved fibers of acrylonitrile polymers and copolymers thereof, wherein the fibers are chracterized by increased water susceptibility and a higher decomposition temperature.

A further object of this invention is to provide a method for the production of said highly improved fibers.

Other objects will become apparent from the description of the invention which follows.

It has been found that a shaped article comprising an acrylontrile polymer or copolymer thereof, in which the polymer molecule contains a major portion of acrylonitrile, and a cyanoethyl ether of cellulose exhibits a higher water susceptibility and a higher decomposition temperature than a shaped article of the acrylonitrile polymer or copolymer thereof alone. It has further been found that such improved shaped articles, in particular fibers, can be prepared or spun from spinning solutions by either the so-called "wet-spinning" or "dry-spinning" technique. The wet-spinning technique has been found to be particularly applicable and it comprises extruding a mixture of an acrylonitrile polymer or copolymer thereof, in which the polymer molecule contains a major portion of acrylontrile, and a cyanoethyl ether of cellulose contained in a suitable liquid spinning medium into a coagulating medium and withdrawing the fibers so obtained.

The following example is illustrative of this invention.

EXAMPLE

Three spinning solutions were prepared by dissolving in dimethyl formamide to a 15% total solids concentration the following polymeric materials:

*Sample 1.*—A polyacrylonitrile in which the polymer molecule contained 97 parts by weight acrylonitrile and 3 parts by weight of vinyl acetate.

*Sample 2.*—A mixture of 90 parts by weight of a polyacrylonitrile, in which the polymer molecule contained 97 parts by weight of acrylonitrile and 3 parts by weight of vinyl acetate, and 10 parts by weight of a cyanoethyl ether of viscose rayon having a degree of substitution of 2.92 cyanoethyl groups per glucose unit and a nitrogen content of 12.% by weight.

*Sample 3.*—A mixture of 75 parts by weight of a polyacrylonitrile, in which the polymer molecule contained 97 parts by weight of acrylonitrile and 3 parts by weight of vinyl acetate, and 25 parts by weight of a cyanoethyl ether of viscose rayon having a degree of substitution of 2.92 cyanoethyl groups per glucose unit and a nitrogen content of 12.9% by weight.

The spinning solutions of the above-mentioned compositions were filtered into a spinning tower under nitrogen pressure and allowed to stand for approximately eight hours until they were free of bubbles. The spinning solution was pumped at room temperature (approximately 25° C.) through a spinneret containing 30 orifices, each having a diameter of 0.005 inch, into a coagulating bath containing 60% dimethyl formamide and 40% water by volume. The fibers were pulled away from the spinneret at a rate faster than they were extruded and passed into a long (approximately six feet) water bath maintained at 75° C. wherein they were stretched to 2½ times their original length. The fibers were then passed into a steam tube which was jacketed with 80 p. s. i. steam and the exhaust steam passed into the tube at 50 p. s. i. The tube was two feet long and therein the fibers were again stretched; the complete draw-down being approximately 4.5 to 1. The fibers were then spooled, dried on the spool and twisted.

The fibers were then tested for water susceptibility and thermal properties (decomposition point in ° C.). The water absorption or water susceptibility properties were determined by subjecting them to complete immersion, 80% relative humidity and 50% relative humidity for 70 hours. The following table sets forth the properties of these novel highly improved modified polyacrylonitrile fibers.

Table

PROPERTIES OF FIBERS OF POLYACRYLONITRILE MODIFIED WITH CYANOETHYL ETHERS OF CELLULOSE

| Property | Sample 1 | Sample 2 | Sample 3 |
|---|---|---|---|
| Denier (measured) | 4.6 | 4.6 | 4.4 |
| Decomposition point, ° C. | 195 | 210 | 214 |
| Water absorption, percent: | | | |
| Immersed | 62 | 104 | 120 |
| 80% R. H. | 0.9 | 1.1 | 1.2 |
| 50% R. H. | 0.5 | 0.6 | 0.4 |

The highly improved physical characteristics of the novel fibers of this invention is made clearly evident from the data set forth in the above table. The decomposition temperature of the cyanoethyl ether of viscose rayon used in preparing samples 2 and 3 above was found to be 215° C. which is significantly higher than that of the polyacrylonitrile alone. It is noted, however, that incorporating even a minor amount of the cyanoethyl ether of viscose rayon with the polyacrylonitrile significantly increased the decomposition temperature of the polyacrylonitrile practically to the point of the cyanoethyl ether of viscose rayon. This is a most surprising and unexpected result. The most striking advantage of the use of the cyanoethyl ether of viscose rayon is seen in considering the water absorption values set forth in the preceding table. By incorporating a small amount of a cyanoethyl ether of cellulose with a polyacrylontrile fiber it is possible to practically double the water susceptibility of the polyacrylonitrile fiber. Due to this increased water susceptibility of the novel improved fibers of this invention, wearing apparel fashioned from the fibers will obviously feel cooler in the summer and warmer in the winter than wearing apparel fashioned from the polyacrylonitrile fiber alone.

While the preceding example has illustrated the enhancement of physical properties of polyacrylonitrile fibers by incorporating therewith a cyanoethyl ether of cellulose derived from viscose rayon, the cyanoethyl ethers of other forms of cellulose can also be used with advantageous results. Thus the cyanoethylated cellulose can be prepared from natural cellulose, such as cotton, chemical cotton, wood pulp, alpha floc and the bast fibers such as hemp, ramie, jute and flax. Cyanoethyl ethers of cellulose prepared from the lower molecular weight celluloses, such as viscose rayon, are preferred. Celluloses having a degree of polymerization of less than about 700 are particularly useful in preparing cyanoethyl ethers of cellulose for modification of polyacrylonitrile fibers as described herein. In preparing the novel shaped articles of this invention by means of either the wet or dry spinning technique, the cyanoethyl ethers of cellulose should be of such a molecular weight and have solubility characteristics such that they will form a non-gelling, high solids, at least 10% by weight, preferably 10% to 35% by weight, spinning solution in the desired solvent medium. Particularly applicable are those cyanoethyl ethers of cellulose which permit the preparation of a dimethyl formamide solution containing 0.1% by weight of the cyanoethylated cellulose having a specific viscosity at 25° C. of 0.1 to 3 and preferably from 0.3 to 1.0.

The degree of cyanoethylation of the cyanoethyl ethers of cellulose useful in this invention is also subject to substantial variation. Preferred results are obtained through the use of cyanoethyl ethers of cellulose containing at least 1.5 cyanoethyl groups per glucose unit. Cyanoethyl ethers of cellulose containing from about 2 to about 3 cyanoethyl groups per glucose unit produce extremely useful modified polyacrylonitrile fibers.

The cyanoethyl ethers of cellulose useful in this invention can be prepared by any of various cyanoethylation processes well known to those skilled in the art. The etherification can be carried out by soaking cellulose in an aqueous solution of alkaline materials such as an alkali metal hydroxide, an alkali metal cyanide or a quaternary ammonium hydroxide, removing the excess alkaline solution and then reacting the alkali-treated cellulose with acrylonitrile, preferably at an elevated temperature. As a particular example, the cyanoethyl ether of viscose rayon used in the preceding example was prepared as follows:

Eighty grams of viscose rayon were soaked in a 2% sodium hydroxide solution for an hour and then pressed until the cellulose contained a 100% uptake of water. The alkali-treated cellulose was placed in a 5-liter flask containing 2½ liters of acrylonitrile. The mixture was refluxed for 45 minutes with stirring. Heat was applied for only the first 15 minutes, since the heat of reaction was sufficient to maintain reflux temperature. The reaction was stopped by the addition of acetic acid in an amount required to neutralize the caustic present. The mixture was then cooled with an ice bath. Methanol was added to precipitate the cyanoethyl ether of cellulose. The product was removed from the reaction mixture, washed with water and then dried. Average analysis of a three-bath run indicated a degree of substitution of 2.92 cyanoethyl groups per glucose unit and a nitrogen content of 12.9%.

The acrylonitrile polymers which can be modified with the cyanoethyl ethers of cellulose and formed into shaped articles in accordance with this invention include polyacrylonitrile and fiber-forming copolymers or interpolymers of acrylonitrile wherein the polymer molecule contains a major portion of acrylonitrile. Those polymeric compositions wherein the polymer molecule contains at least 70%, and preferably from 85–98%, by weight of acrylonitrile, are particularly advantageous. The acrylonitrile can be copolymerized with one or more other polymerizable substances such as: vinyl acetate, styrene, vinyl chloride, the vinyl pyridines and particularly 2-vinyl pyridine, isobutyne, dimethyl furorate, methyl methacrylate, methacrylonitrile, acrylic acid and its esters, etc. The acrylonitrile polymers and copolymers may be prepared by any suitable polymerization method such as, for example, the ammonium persulfate-catalyzed polymerization of monomer or monomers dissolved or emulsified in water. Molecular weights of these polymers and copolymers are preferably within the range of 10,000 and 250,000, or even higher, although polymers having molecular weights between 30,000 and 150,000 may be used with particular advantage in the production of fibers.

The novel shaped articles of this invention can contain acrylonitrile polymers and cyanoethyl ethers of cellulose in all proportions. Preferably, however, the shaped articles contain a major proportion of the acrylonitrile polymer. Particularly useful shaped articles exhibiting outstanding properties are those which contain not more than 30% by weight of the cyanoethyl ether of cellulose, as for example from about 1% to about 30% by weight of the cyanoethyl ether of cellulose.

The novel shaped articles of this invention may be produced by any of the various techniques well known to those skilled in the art. Thus they may be cast from suitable solutions in organic solvents or they may be spun by either the wet-spinning technique or the dry-spinning technique. In general, the spinning solutions may be prepared by heating the polymeric materials in the desired proportions in a suitable spinning solvent. Typical of such solvents are dimethyl formamide, dimethyl acetamide, tetrahydropyran, tetrahydrofuran, morpholine, various organophosphonates, ethylene carbonate, various sulfones, etc. Such spinning solutions should preferably contain from about 10% to about 35% by weight of solids (polymeric material). In preparing the spinning solutions, the solutions are preferably heated to a temperature of from about 50° C. to about 100° C.. Advantageously, the heated mixtures of polymer and solvent, or solutions thereof, are maintained in an inert or oxygen-free atmosphere to minimize discoloration. The temperature of extrusion may be varied over a substantial range as, for example, from room temperature (25° C.) to about 150° C. In certain applications temperatures in the range of from about 80° to about 120° C. are particularly preferred, although this temperature range will vary with the various solvents used in preparing the spinning solution.

When employing the dry spinning technique the spinning solution is extruded into a hot inert atmosphere as, for example, hot air or other inert gas which vaporizes the solvent and permits the collection of the extruded fiber. In the wet spinning technique the spinning solution is extruded into a suitable coagulating bath, for example, water, aqueous solutions or inorganic salts such as ammonium chloride and sodium thiocyanate, triethanolamine, ethylene glycol, glycerin, dilute sulfuric acid, or aqueous solutions of the organic solvent used in the spinning bath. The temperature of the coagulating bath is also subject to substantial variation, as, for example, from room temperature (25° C.) to about 150° C. If desired higher temperatures may be employed under suitable conditions.

The freshly coagulated materials may be washed with an aqueous medium such as water or steam and then stretched to the desired degree. If desired, the washing treatment may be performed before or after the stretching operation or both. The stretching may be accomplished in secondary baths containing materials similar to those suitable for use in the coagulating baths or if desired, in other heated media such as, for example, inert liquids or gases. Steam may be employed both as the aqueous washing medium and also as the heated stretching medium. Further, if desired, the freshly formed thread and yarn products may, while in the presence of steam, substantially simultaneously be washed with an aqueous medium and stretched. If desired, under suitable conditions, the freshly formed thread and yarn products may be treated directly with steam while simultaneously stretched.

The stretched products may be heat-treated while in a relaxed condition at temperatures of between 100° C. and 180° C. to improve their physical properties. The expression "relaxed condition" is intended to include the heat-treatment of threads and yarns at no tension or at relatively low tensions.

For various purposes it may be desirable to further enhance or physically modify the polymeric compositions of the invention by incorporating therewith other materials such as, for example, pigments, dyes, plasticizers, stabilizers, spinning agents and even other polymeric bodies.

What is claimed is:

1. A shaped article comprising a cyanoethyl ether of cellulose and a polymer of acrylonitrile containing in the polymer molecule a major amount of acrylonitrile.

2. A shaped article comprising a cyanoethyl ether of cellulose and a polymer of acrylonitrile containing in the polymer molecule at least 70% by weight of acrylonitrile.

3. A shaped article comprising a cyanoethyl ether of cellulose and a polymer of acrylonitrile containing in the polymer molecule from about 85% to about 98% by weight of acrylonitrile.

4. A shaped article comprising a cyanoethyl ether of cellulose having a degree of polymerization of less than about 700, and a major amount of a polymer of acrylonitrile containing in the polymer molecule at least 70% by weight of acrylonitrile.

5. A shaped article comprising a cyanoethyl ether of cellulose having a degree of polymerization of less than about 700 and at least about 1.5 cyanoethyl groups per glucose unit, and a major amount of a polymer of acrylonitrile containing in the polymer molecule at least 70% by weight of acrylonitrile.

6. A shaped article comprising a cyanoethyl ether of cellulose having a degree of polymerization of less than about 700 and from about 2 to about 3 cyanoethyl groups per glucose unit, and a major amount of a polymer of acrylonitrile containing in the polymer molecule at least 70% by weight of acrylonitrile.

7. A shaped article comprising not more than about 30% by weight of a cyanoethyl ether of cellulose having a degree of polymerization of less than about 700 and from about 2 to about 3 cyanoethyl groups per glucose unit, and a polymer of acrylonitrile containing in the polymer molecule at least 70% by weight of acrylonitrile.

8. A shaped article as described in claim 7 wherein the cyanoethyl ether of cellulose is the cyanoethyl ether of viscose rayon.

9. A shaped article as described in claim 8 wherein the polymer of acrylonitrile is a copolymer of acrylonitrile and vinyl acetate.

10. A fiber comprising a cyanoethyl ether of cellulose and a polymer of acrylonitrile containing in the polymer molecule a major amount of acrylonitrile.

11. A fiber comprising a cyanoethyl ether of cellulose and a polymer of acrylonitrile containing in the polymer molecule at least 70% by weight of acrylonitrile.

12. A fiber comprising a cyanoethyl ether of cellulose and a polymer of acrylonitrile containing in the polymer molecule from about 85% to about 98% by weight of acrylonitrile.

13. A fiber comprising a cyanoethyl ether of cellulose having a degree of polymerization of less than about 700, and a major amount of a polymer of acrylonitrile containing in the polymer molecule at least 70% by weight of acrylonitrile.

14. A fiber comprising a cyanoethyl ether of cellulose having a degree of polymerization of less than about 700 and at least about 1.5 cyanoethyl groups per glucose unit, and a major amount of a polymer of acrylonitrile containing in the polymer molecule at least 70% by weight of acrylonitrile.

15. A fiber comprising a cyanoethyl ether of cellulose having a degree of polymerization of less than about 700 and from about 2 to about 3 cyanoethyl groups per glucose unit, and a major amount of a polymer of acrylonitrile containing in the polymer molecule at least 70% by weight of acrylonitrile.

16. A fiber comprising not more than about 30% by weight of a cyanoethyl ether of cellulose having a degree of polymerization of less than about 700 and from about 2 to about 3 cyanoethyl groups per glucose unit, and a polymer of acrylonitrile containing in the polymer molecule at least 70% by weight of acrylonitrile.

17. A fiber as described in claim 16 wherein the cyanoethyl ether of cellulose is the cyanoethyl ether of viscose rayon.

18. A fiber as described in claim 17 wherein the polymer of acrylonitrile is a copolymer of acrylonitrile and vinyl acetate.

References Cited in the file of this patent

UNITED STATES PATENTS 2,404,714  Latham _____ July 23, 1946